(12) United States Patent
Popov

(10) Patent No.: US 11,137,090 B2
(45) Date of Patent: Oct. 5, 2021

(54) APPARATUS AND METHOD FOR SNAP-FIT CLAMPING ASSEMBLY

(71) Applicant: The Boeing Company, Chicago, IL (US)

(72) Inventor: Maxim A. Popov, Zhukovsky (RU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/803,333

(22) Filed: Feb. 27, 2020

(65) Prior Publication Data

US 2021/0270392 A1    Sep. 2, 2021

(51) Int. Cl.
*F16L 5/00* (2006.01)
*B64F 5/10* (2017.01)
*B64C 1/18* (2006.01)
*F16L 3/10* (2006.01)

(52) U.S. Cl.
CPC ............... *F16L 5/00* (2013.01); *B64C 1/18* (2013.01); *B64F 5/10* (2017.01); *F16L 3/1075* (2013.01)

(58) Field of Classification Search
None
See application file for complete search history.

(56) References Cited

U.S. PATENT DOCUMENTS

| | | | | |
|---|---|---|---|---|
| 5,537,714 A * | 7/1996 | Lynch, Jr. | ............ | B60R 16/0222 16/2.1 |
| 6,538,201 B1 * | 3/2003 | Gretz | .................... | H02G 3/0691 16/2.1 |
| 6,642,451 B1 * | 11/2003 | Gretz | .................... | F16L 33/227 16/2.1 |
| 6,860,758 B1 * | 3/2005 | Kiely | ..................... | H01R 4/363 174/652 |
| 7,060,900 B1 * | 6/2006 | Gretz | .................... | H02G 15/013 174/652 |
| 8,253,043 B1 * | 8/2012 | Kiely | ................... | H02G 3/0616 174/659 |
| 8,350,163 B2 * | 1/2013 | Auray | ....................... | F16L 5/00 174/650 |
| 9,000,299 B2 * | 4/2015 | Ruth | ........................ | H02G 3/32 174/72 A |
| 9,303,790 B2 * | 4/2016 | Kim | .......................... | F16L 3/13 |
| 10,269,473 B1 * | 4/2019 | Gretz | .................... | H02G 3/0683 |

* cited by examiner

*Primary Examiner* — Steven M Marsh
(74) *Attorney, Agent, or Firm* — Quinn IP Law

(57) ABSTRACT

A clamping assembly for supporting a tubular object accessing a through-hole in a panel includes a clamp and a retainer configured to be positioned at least partially around the tubular object on a first side and a second side, respectively, of the through-hole. The clamp and retainer respectively include at least one clamp lock mechanism and at least one retainer lock mechanism configured to move between a respective open position and a respective closed position. The clamp includes at least one clamp hook configured to engage with the at least one retainer hole in the retainer in a snap-fit relation when the clamp and the retainer are in the respective closed position at the first side and second side, respectively, of the through-hole. A method of supporting a tubular object and an aircraft having the clamping assembly are also disclosed.

20 Claims, 6 Drawing Sheets

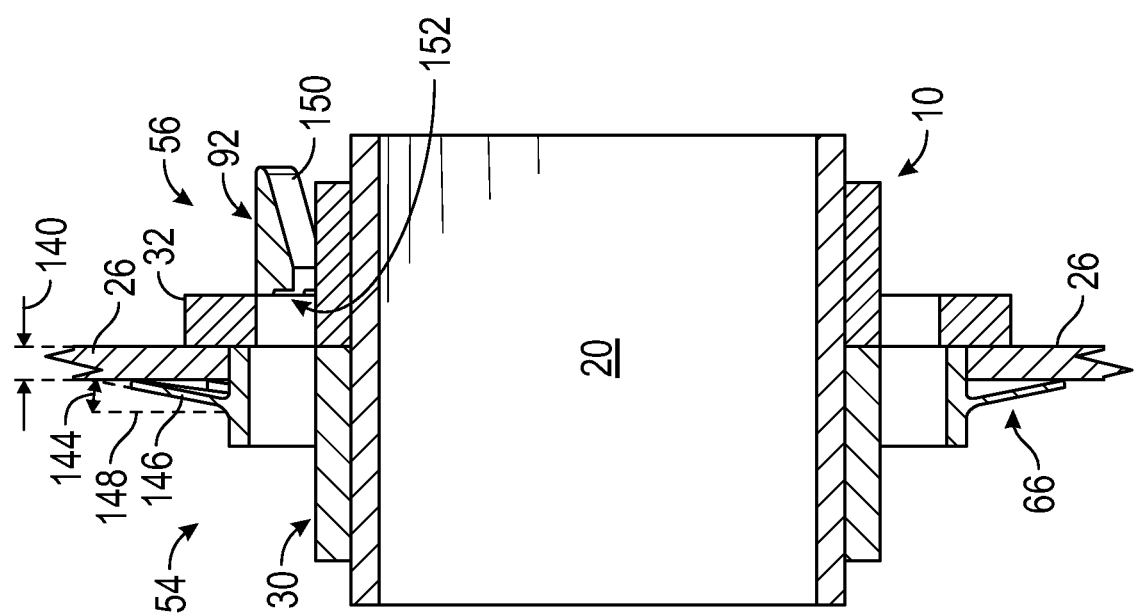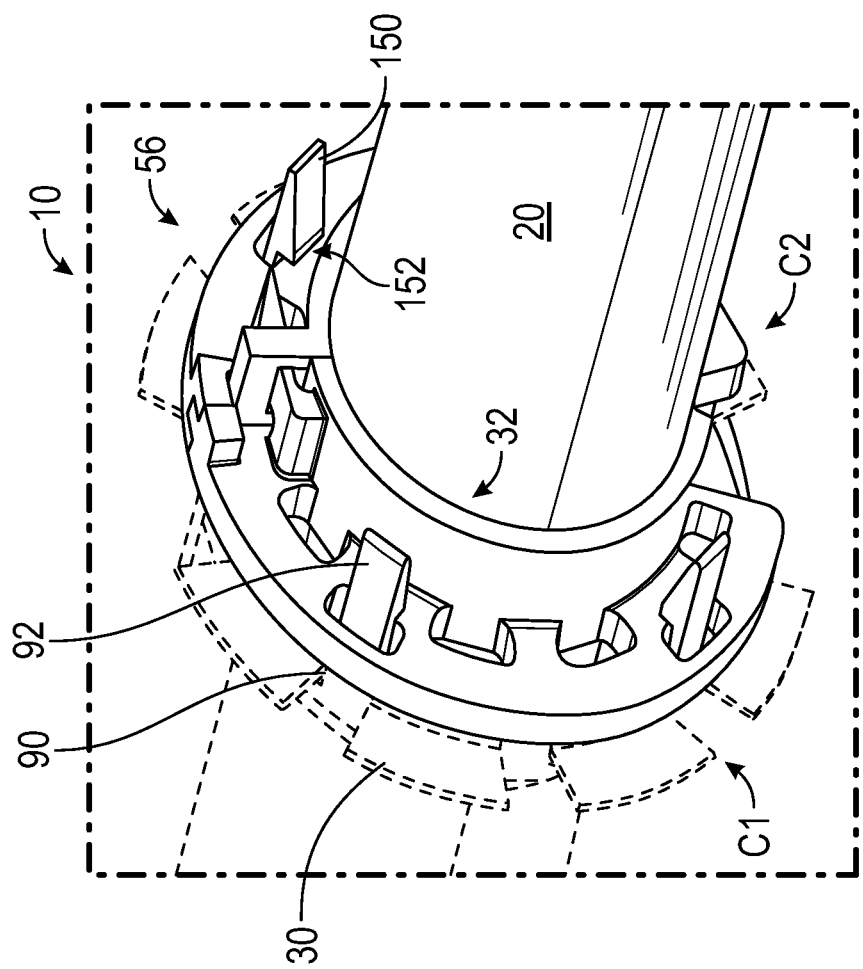

APPARATUS AND METHOD FOR SNAP-FIT CLAMPING ASSEMBLY

TECHNICAL FIELD

The disclosure relates generally to a clamping assembly, and more particularly, to a clamping assembly for supporting a tubular object accessing an opening.

BACKGROUND

Many devices have tubes or pipes that need to access or structurally penetrate various panels. For example, an aircraft may include multiple floor beams lining up from the head to the tail of the aircraft, with openings for tubes carrying various fluids across the aircraft. The openings may have a significant variation in size for multiple reasons, including but not limited to, the application of edge sealant for corrosion protection. The variation in size may cause the opening to be either too small for a particular tube at some locations or too large at some locations. Assemblies supporting such tubes may include brackets that require the drilling of additional holes in the structure and time-consuming installation.

SUMMARY

Disclosed herein is a clamping assembly for supporting a tubular object accessing a through-hole in a panel. The clamping assembly includes a clamp configured to be positioned at least partially around the tubular object on a first side of the through-hole and a retainer configured to be positioned at least partially around the tubular object on a second side of the through-hole. The clamp and the retainer each define a respective open position and a respective closed position. The clamp includes at least one clamp lock mechanism configured to move the clamp between the respective open position and the respective closed position. The retainer includes at least one retainer lock mechanism configured to move the retainer between the respective open position and the respective closed position. The retainer includes a rim portion having at least one retainer hole.

The clamp includes at least one clamp hook configured to engage with the retainer hole in a snap-fit relation when the clamp and the retainer are in the respective closed position at the first side and second side, respectively, of the through-hole. The clamping assembly enables quick installation of duct-like system components passing through structural penetrations. For example, the panel may be a floor beam in an aircraft and the tubular object may be a fuel line passing through multiple floor beams across an aircraft. The clamping assembly has the advantage of eliminating the need for drilling additional holes in structure (e.g. for installing brackets), thus reducing the time required for installation and complexity.

The clamp hook may include an inclined surface contiguous with a hook base. The hook base is configured to extend over the retainer when the clamp and the retainer are in the respective closed position. The rim portion of the retainer may include a plurality of cutouts which are spaced apart and have a predefined size and a predefined shape. The clamp may include a clamp base portion and a plurality of membranes extending radially outward from the clamp base portion. The plurality of membranes may be spaced apart in a circumferential direction and may be configured to be sufficiently resilient to accommodate different thicknesses of the panel. The plurality of membranes defines a respective membrane angle between a respective first surface and a reference line parallel to the panel. In one example, the respective membrane angle is between about 15 and 30 degrees.

The clamp may include a flexible clamp joint, between a first clamp base and a second clamp base, configured to allow bending of the clamp. The retainer may include a flexible retainer joint, between a first retainer base and a second retainer base, configured to allow bending of the retainer. The first clamp base defines a first end and the second clamp base defines a second end, with the first end and the second end being distal to the flexible clamp joint.

The clamp lock mechanism may include a primary clamp lock mechanism characterized by a first latch and a first slot, the first latch extending from the first end and the first slot being located on the second end. The first latch may be configured to engage with the first slot when the clamp is in the respective closed position such that the clamp fully encircles the tubular object at the first side of the through-hole. The clamp lock mechanism may include a secondary clamp lock mechanism characterized by a first locking tab and a first groove. The first locking tab may be configured to interlock with the first groove when the clamp is in the respective closed position. The first locking tab extends from the first end of the first clamp base, the first locking tab being positioned radially outward of the first latch. The first groove may be located at the second end of the second clamp base and may be positioned radially outward of the first slot.

The first retainer base defines a first edge and the second retainer base defines a second edge, the first edge and the second edge being distal to the flexible retainer joint. The retainer lock mechanism may include a primary retainer lock mechanism characterized by a second latch and a second slot, the second latch extending from the first edge and the second slot being located on the second edge. The second latch may be configured to engage with the second slot when the retainer is in the respective closed position such that the retainer fully encircles the tubular object at the second side of the through-hole.

The retainer lock mechanism may include a secondary retainer lock mechanism characterized by a second locking tab and a second groove. The second locking tab may be configured to interlock with the second groove when the retainer is in the respective closed position. The second locking tab extends from the first edge of the first retainer base, the second locking tab being radially outwards of the second latch. The second groove may be located at the second end of the second retainer base, the second groove being radially outwards of the second slot. The rim portion of the retainer may include a first rim portion and a second rim portion separated by a gap, the first rim portion extending radially outwards from the first retainer base and the second rim portion extending radially outwards from the second retainer base.

Disclosed herein is a method for supporting a tubular object accessing a through-hole in a panel. The method includes positioning a clamp in a respective open position at least partially around the tubular object on a first side of the through-hole and moving the clamp into a respective closed position via at least one clamp lock mechanism. A retainer is positioned in the respective open position at least partially around the tubular object on a second side of the through-hole and moved into a respective closed position via at least one retainer lock mechanism. The retainer includes at least one retainer hole. The method includes aligning the retainer hole with at least one clamp hook in the clamp and pushing the retainer towards the clamp until the clamp hook is engaged with the at least one retainer hole in a snap-fit relation.

The method may include providing a primary clamp lock mechanism in the clamp lock mechanism, the primary clamp lock mechanism being characterized by a first latch extending from a first end of the first clamp base and a first slot located on a second end of the second clamp base, the first end and the second end being distal to the flexible clamp joint. The method may include engaging the first latch with the first slot when the clamp is in the respective closed position such that the clamp fully encircles the tubular object at the first side of the through-hole.

The method may include providing a primary retainer lock mechanism in the retainer lock mechanism, the primary retainer lock mechanism being characterized by a second latch extending from a first edge of the first retainer base and a second slot located on a second edge of the second retainer base, the first edge and the second edge being distal to the flexible retainer joint. The method may include engaging the second latch with the second slot when the retainer is in the respective closed position such that the retainer fully encircles the tubular object at the second side of the through-hole.

The method may include providing a secondary clamp lock mechanism in the at least one clamp lock mechanism, the secondary clamp lock mechanism being characterized by a first locking tab extending from the first end of the first clamp base and a first groove located at the second end of the second clamp base, the first locking tab and the first groove being respectively radially outwards of the first latch and the first slot. The method may include interlocking the first locking tab with the first groove when the clamp is in the respective closed position.

The method may include providing a secondary retainer lock mechanism in the at least one retainer lock mechanism, the secondary retainer lock mechanism being characterized by a second locking tab extending from the first end of the first retainer base and a second groove located at the second end of the second retainer base, the second locking tab and the second groove being positioned respectively radially outward of the second latch and the second slot. The method may include interlocking the second locking tab with the second groove when the retainer is in the respective closed position.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 6 is a schematic fragmentary view of the clamping assembly of FIG. 1, shown from a second side of the through-hole;

FIG. 7 is a schematic sectional view of the clamping assembly of FIG. 1;

DETAILED DESCRIPTION

Figure 1:
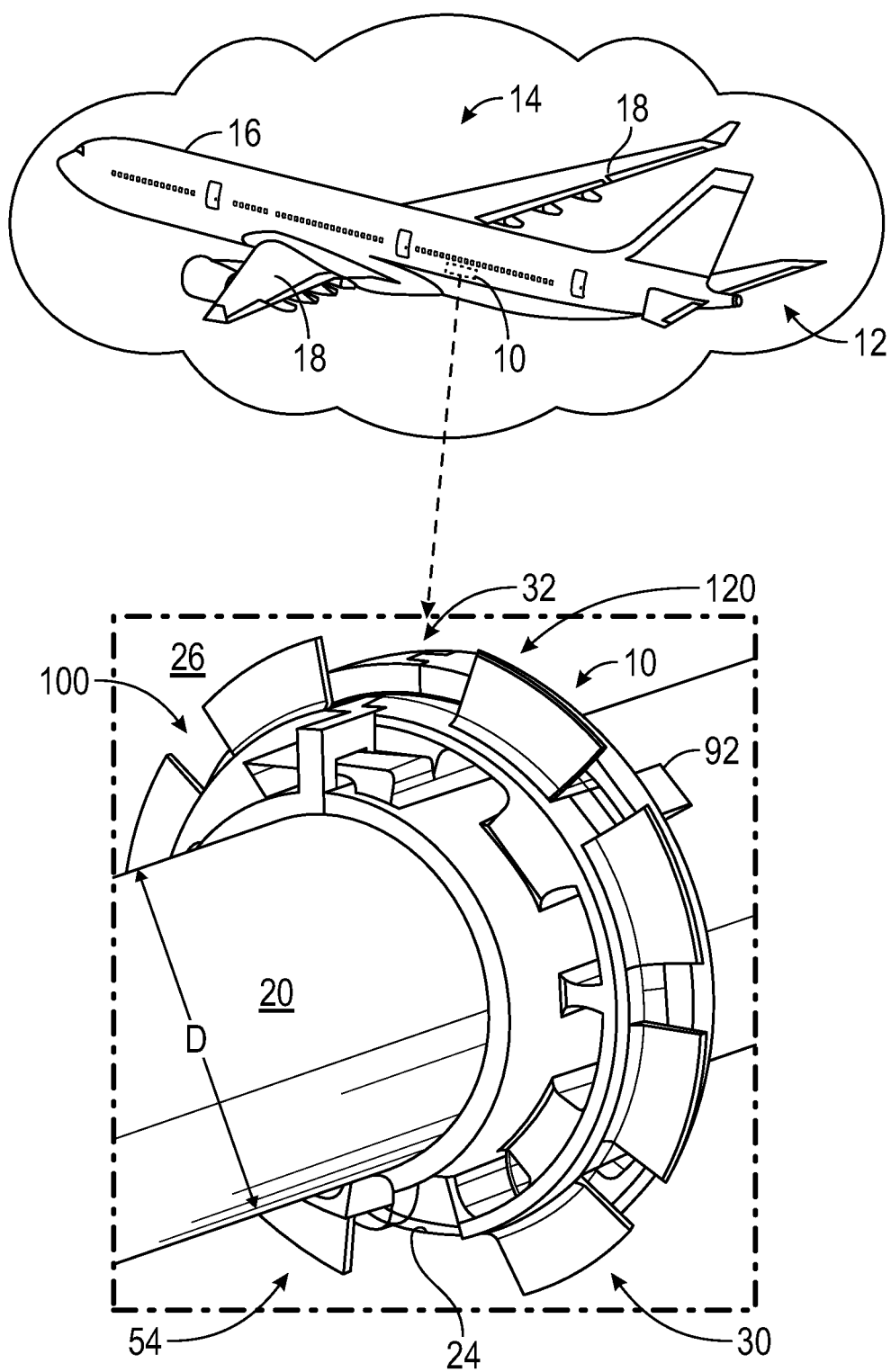
FIG. 1 is a schematic fragmentary view of a clamping assembly employed in an aircraft, shown from a first side of a through-hole, the clamping assembly having a clamp and a retainer.

Referring to the drawings, wherein like reference numbers refer to like components, FIG. 1 schematically illustrates a clamping assembly 10, which may be part of a device 12. In the example shown in FIG. 1, the device 12 is an aircraft 14 incorporating a fuselage 16 and wings 18. It is to be understood that the device 12 may take many different forms and have additional components. The device 12 may be a mobile platform such as, but not limited to, a passenger vehicle, sport utility vehicle, light truck, heavy duty vehicle, ATV, minivan, bus, transit vehicle, bicycle, moving robot, farm implement (e.g. tractor), sports-related equipment (e.g. golf cart), boat and train. The device 12 may be a non-mobile platform.

Figure 2:
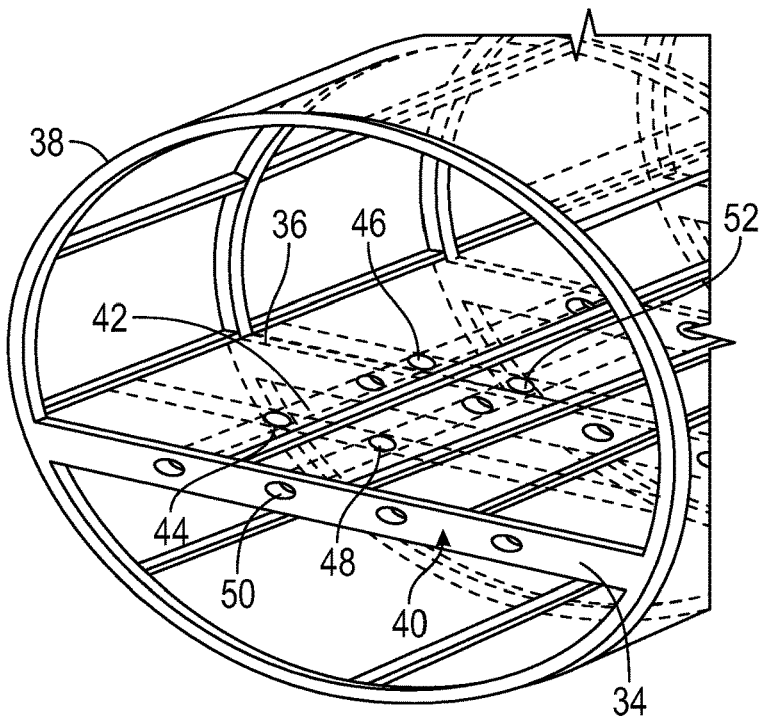
FIG. 2 is a schematic fragmentary cut-away view of part of the aircraft of FIG. 1.

Referring to FIG. 1, the clamping assembly 10 is configured to support a tubular object 20 accessing (or passing through) a through-hole 24 in a panel 26. The clamping assembly includes a clamp 30 and a retainer 32. The panel 26 may be a floor beam in the aircraft 14 and the tubular object 20 may be a fuel line. FIG. 2 illustrates a cut-away portion of the aircraft 14. The aircraft 14 includes multiple floor beams, such as first beam 34 and second beam 36, that are spaced apart and located within an outer skin 38. Referring to FIG. 2, the first beam 34 and second beam 36 each include respective through-holes 40. A first fluid line 42 may be configured to pierce a first through-hole 44 in the first beam 34 and a second through-hole 46 in the second beam 36. Referring to FIG. 2, a second fluid line 48 may be configured to pierce a third through-hole 50 in the first beam 34 and a fourth through-hole 52 in the second beam 36. In one example, the first fluid line 42 and the second fluid line 48 extend across the length of the aircraft 14.

Figure 3:
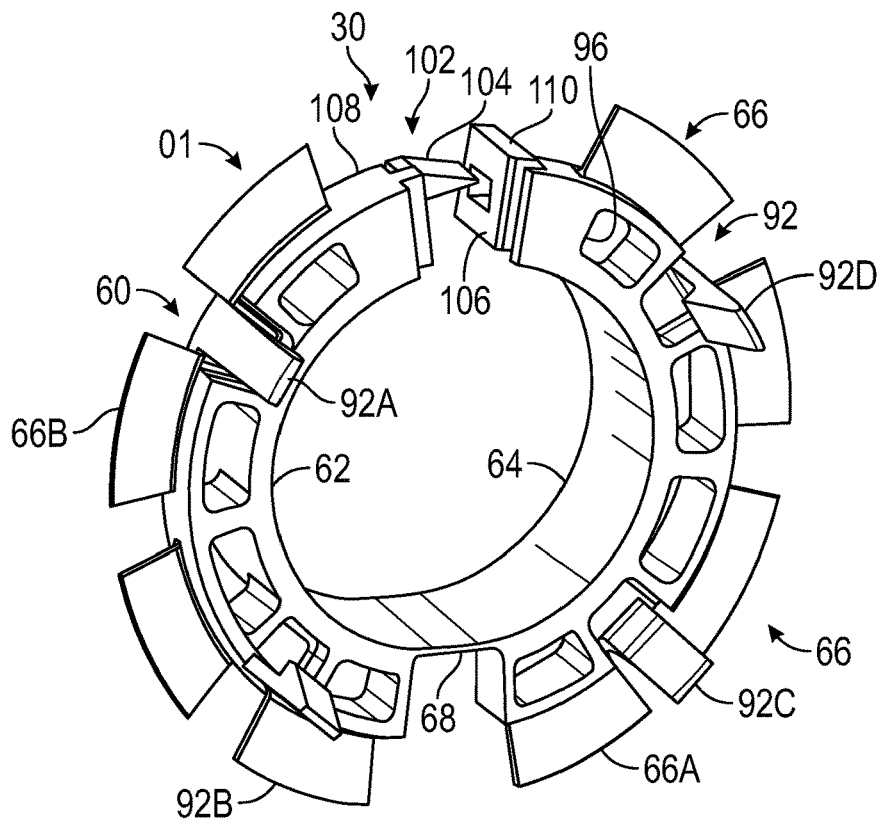
FIG. 3 is a schematic perspective view of the clamp of FIG. 1.
Figure 4:
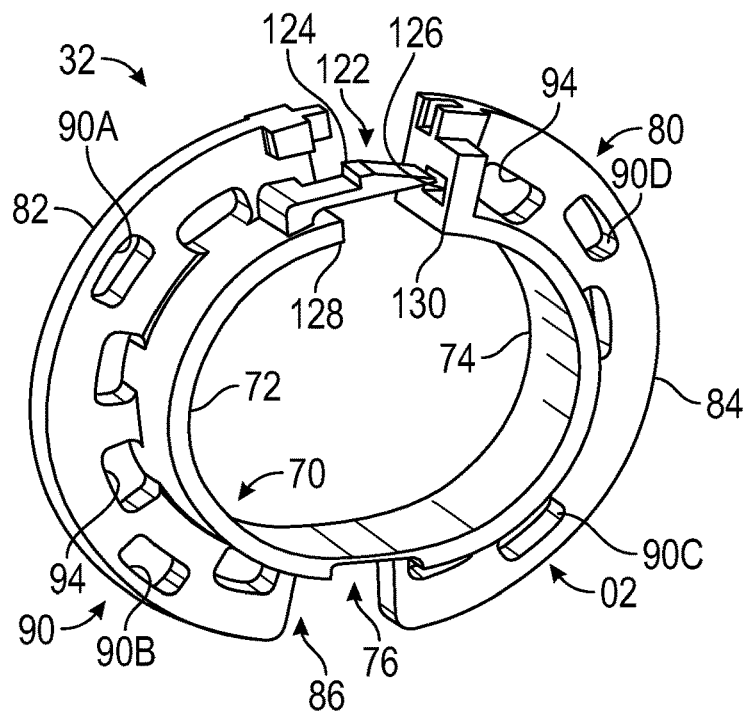
FIG. 4 is a schematic perspective view of the retainer of FIG. 1.
Figure 5:
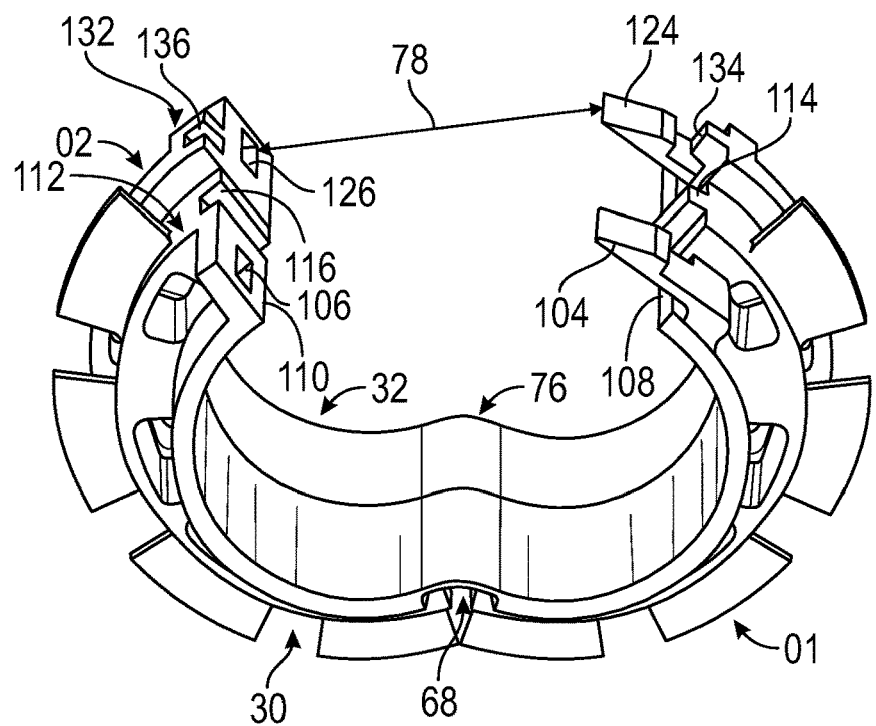
FIG. 5 is a schematic perspective view of the clamp and retainer of FIG. 1, positioned side-by-side.

Referring now to FIGS. 3-4, a schematic perspective view of the clamp 30 and the retainer 32, respectively, are shown. The clamp 30 and the retainer 32 are movable between a respective open position O1, O2 (shown in FIGS. 3-5) and a respective closed position C1, C2 (shown in FIGS. 1, 6 and 7). FIG. 5 is a schematic perspective view of the clamp 30 and retainer 32 positioned side-by-side, in the respective open position O1, O2. Referring to FIG. 1, the clamp 30 configured to be positioned at least partially around the tubular object 20 on a first side 54 of the through-hole 24. FIG. 6 shows the clamping assembly 10 from a second side 56 of the through-hole 24. Referring to FIG. 6, the retainer 32 is configured to be positioned at least partially around the tubular object 20 on the second side 56. FIG. 7 is a schematic sectional view of the clamping assembly 10.

The clamping assembly 10 provides a host of technical advantages. First, it does not require a tight tolerance on the through-hole 24 for installation. Second, it minimizes damage to any edge sealant at the through-hole 24 during the installation. Additionally, the clamping assembly 10 eliminates the need for drilling additional holes in structure (e.g.

for installing brackets), thus reducing the time required for installation and the complexity of installation.

Referring to FIG. 3, the clamp 30 includes a clamp base portion 60 that is at least partially annular and divided into a first clamp base 62 and a second clamp base 64. A plurality of membranes 66 may extend radially outward from the clamp base portion 60, such as membrane 66B on the first clamp base 62 and membrane 66A on the second clamp base 64. The plurality of membranes 66 are spaced apart in a circumferential direction. The size and number of the plurality of membranes 66 may be varied based on the application at hand.

Referring to FIGS. 3 and 5, the clamp 30 may include a flexible clamp joint 68 between the first clamp base 62 and the second clamp base 64. Referring to FIG. 4, the retainer 32 includes a retainer base portion 70 that is at least partially annular and is divided into a first retainer base 72 and a second retainer base 74. Referring to FIG. 4, the retainer 32 may include a flexible retainer joint 76 between the first retainer base 72 and the second retainer base 74. The flexible clamp joint 68 and flexible retainer joint 76 are configured to allow bending of the clamp 30 and the retainer 32, respectively, enabling an opening span 78 (shown in FIG. 5). The opening span 78 is configured to be greater than or equal to a diameter D (shown in FIG. 1) of the tubular object 20. The clamp 30 and the retainer 32 may be composed of a substantially resilient material, such as but not limited to, polymers and plastics. In one example, the clamp 30 and the retainer 32 are composed of nylon.

Referring to FIG. 4, the retainer 32 has a rim portion 80 extending radially outward from the retainer base portion 70. Referring to FIG. 4, the rim portion 80 may include a first rim portion 82 and a second rim portion 84 separated by a gap 86, the first rim portion 82 extending radially outwards from the first retainer base 72 and the second rim portion 84 extending radially outwards from the second retainer base 74. Referring to FIG. 1, the rim portion 80 has at least one retainer hole 90.

Referring to FIGS. 1, 6 and 7, the clamp 30 includes at least one clamp hook 92 configured to engage with the at least one retainer hole 90 in a snap-fit relation when the clamp 30 is in the respective closed position C1 at the first side 54 of the through-hole 24 (see FIG. 1) and the retainer 32 is in the respective closed position C2 at the second side 56 of the through-hole 24 (see FIG. 6). In the example illustrated herein, the retainer 32 includes four retainer holes 90A, B, C, D (see FIG. 4) spaced apart by 90 degrees and the clamp 30 includes four clamp hooks 92A, B, C, D (see FIG. 3) spaced apart by 90 degrees. However, it is understood that the number, size, shape and angular position of the retainer holes 90 and clamp hooks 92 may be varied based on the application at hand.

Referring to FIG. 4, the rim portion 80 may include a plurality of cutouts 94 for reduction of mass. The plurality of cutouts 94 may be spaced apart and have a predefined size and a predefined shape. In one example, the size and shape of the plurality of cutouts 94 are varied in order to provide an optimal mass of the retainer. Similarly, referring to FIG. 3, the clamp base portion 60 may include a plurality of clamp base cutouts 96.

The clamp 30 includes at least one clamp lock mechanism 100 (see FIG. 1) configured to open and close the clamp 30, such as primary clamp lock mechanism 102 (shown in FIG. 3). Referring to FIGS. 3 and 5, the first clamp base 62 defines a first end 108 and the second clamp base 64 defines a second end 110, the first end 108 and the second end 110 being distal to the flexible clamp joint 68. Referring to FIG. 5, the primary clamp lock mechanism 102 is characterized by a first latch 104 and a first slot 106, the first latch 104 extending from the first end 108 and the first slot 106 being located on the second end 110. The first latch 104 is configured to engage with the first slot 106 when the clamp 30 is in the respective closed position C1 such that the clamp 30 fully encircles the tubular object 20 at the first side 54 (as shown in FIGS. 1 and 7).

The clamp lock mechanism 100 may include a secondary clamp lock mechanism 112 (shown in FIG. 5) characterized by a first locking tab 114 and a first groove 116, the first locking tab 114 being configured to interlock with the first groove 116 when the clamp 30 is closed. The first locking tab 114 extends from the first end 108 of the first clamp base 62, the first locking tab 114 being radially outwards of the first latch 104. The first groove 116 may be located at the second end 110 of the second clamp base 64, the first groove 116 being radially outwards of the first slot 106.

Referring to FIG. 1, the retainer 32 includes at least one retainer lock mechanism 120 configured to open and close the retainer 32, such as a primary retainer lock mechanism 122 (shown in FIG. 4). characterized by a second latch 124 and a second slot 126. Referring to FIG. 4, the first retainer base 72 defines a first edge 128 and the second retainer base 74 defines a second edge 130, the first edge 128 and the second edge 130 being distal to the flexible retainer joint 76. Referring to FIG. 4, the primary retainer lock mechanism 122 is characterized by a second latch 124 and a second slot 126, the second latch 124 extending from the first edge 128 and the second slot 126 being located on the second edge 130. The second latch 124 may be configured to engage with the second slot 126 when the retainer 32 is closed such that the retainer 32 fully encircles the tubular object 20 at the second side 56 of the through-hole 24 (see FIGS. 6 and 7).

The retainer lock mechanism 120 may include a secondary retainer lock mechanism 132 (shown in FIG. 5) characterized by a second locking tab 134 and a second groove 136. Referring to FIG. 5, the second locking tab 134 is configured to interlock with the second groove 136 when the retainer 32 is closed. The second locking tab 134 extends from the first edge 128 of the first retainer base 72, the second locking tab 134 being radially outwards of the second latch 124. Referring to FIG. 5, the second groove 136 may be located at the second edge 130 of the second retainer base 74, the second groove 136 being radially outwards of the second slot 126.

Referring to FIG. 7, the plurality of membranes 66 may be configured to be sufficiently resilient to accommodate or adapt to different thicknesses 140 of the panel 26. Stated differently, the plurality of membranes 66 is configured to flex to accommodate different thicknesses 140 of the panel 26. Referring to FIG. 7, the plurality of membranes 66 define a respective membrane angle 144 between a respective edge 146 and a reference line 148 parallel to the panel. The respective membrane angle 144 may be between about 15 and 30 degrees. Referring to FIGS. 6 and 7, the clamp hook 92 may include an inclined surface 150 contiguous with a hook base 152. Referring to FIGS. 6 and 7, the hook base 152 is configured to extend over the retainer 32 when the clamp 30 and the retainer 32 are attached to each other in a snap-fit manner.

Figure 8:
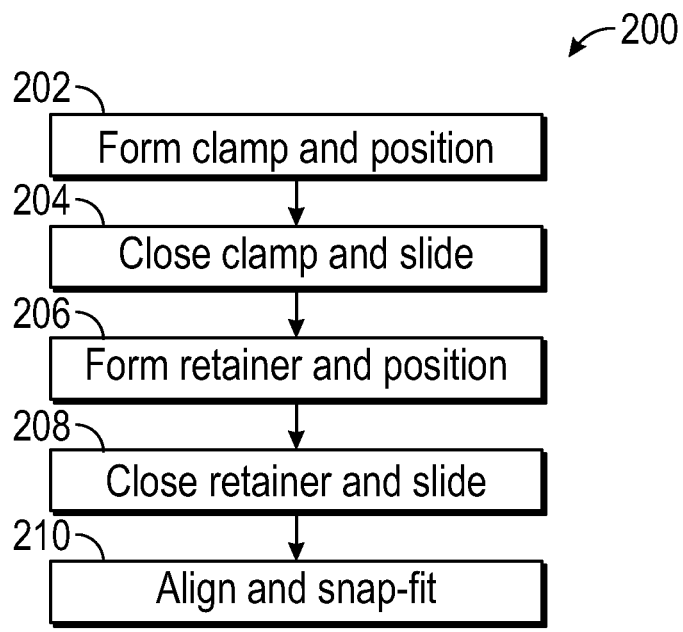
FIG. 8 is a flowchart of a method for supporting a tubular object accessing a through-hole in a panel, via the clamping assembly of FIG. 1.
Figure 9:
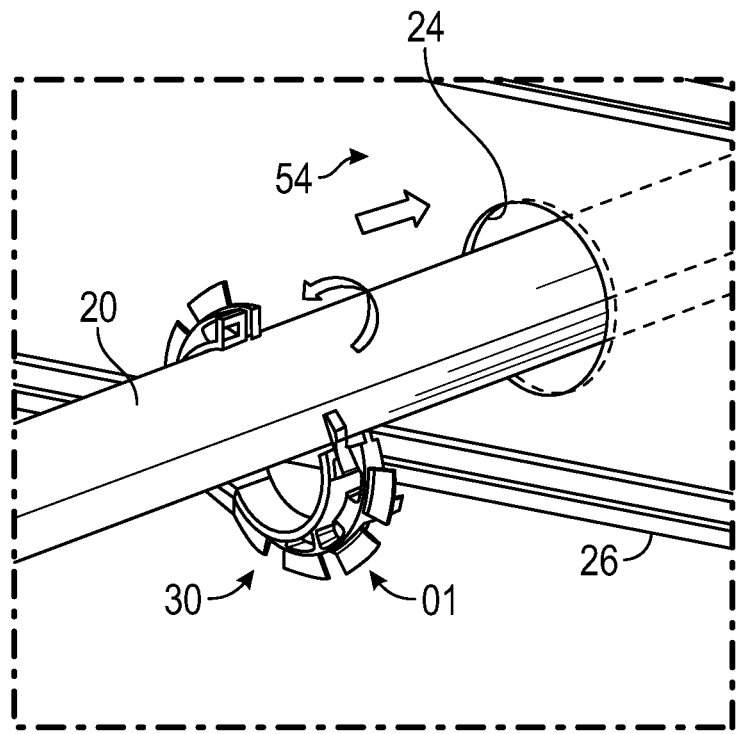
FIGS. 9-11 are schematic perspective fragmentary views of the clamping assembly of FIG. 1, illustrating a portion of the method of FIG. 8.
Figure 10:
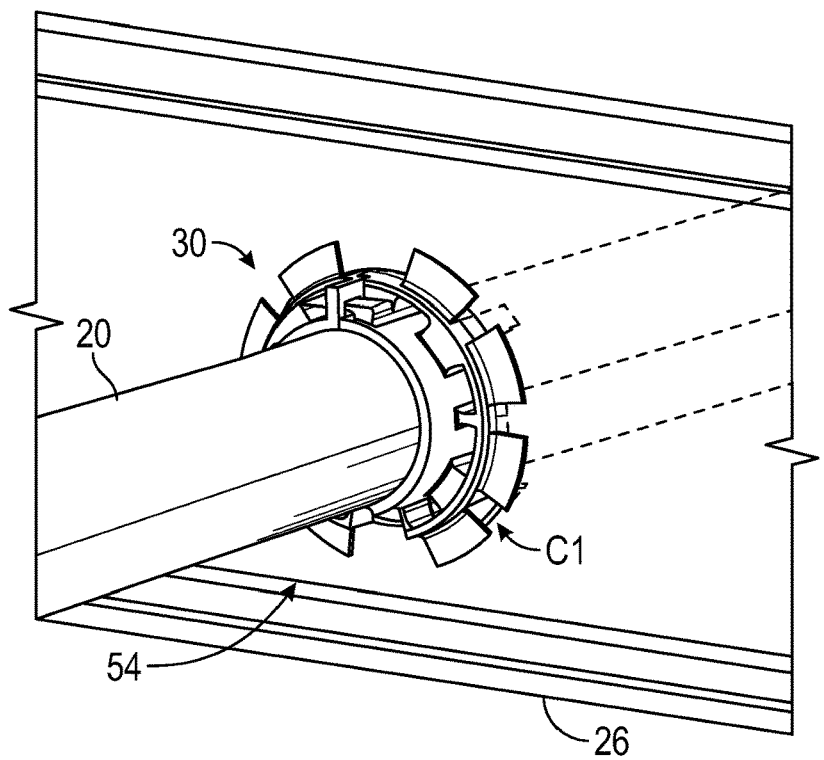
Figure 11:
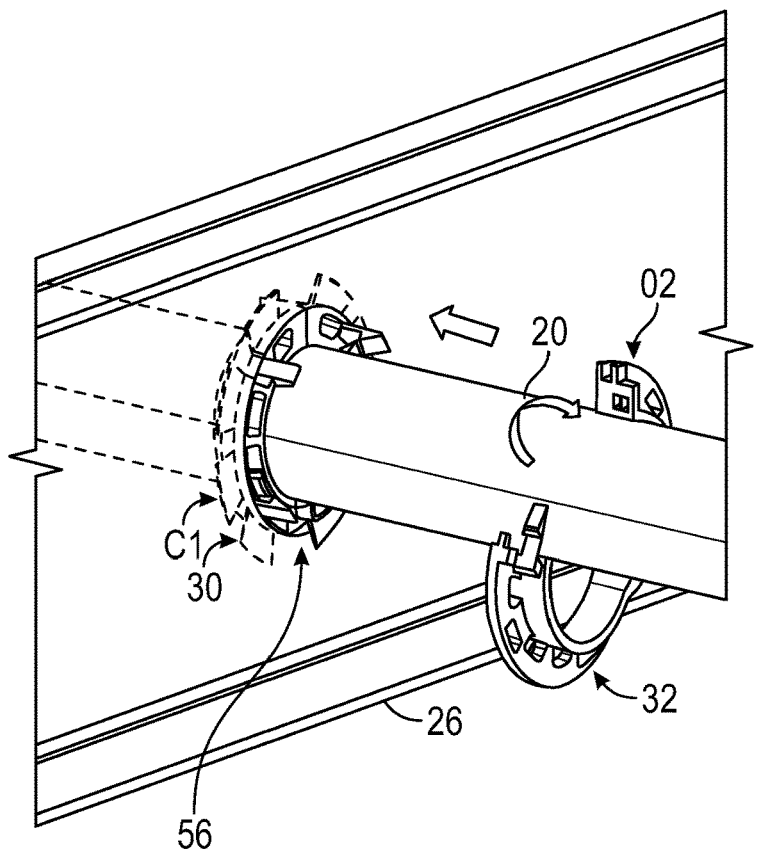

FIG. 8 is a flowchart of a method 200 for supporting the tubular object 20, via the clamping assembly 10. FIGS. 9-11 are schematic perspective views illustrating the method 200. It is to be understood that the method 200 need not be applied in the specific order recited herein and that some steps may be eliminated. Per block 202 of FIG. 8 and referring to FIG. 9, the method 200 includes forming the clamp 30 as described above and positioning the clamp 30 in the respective open position O1 at least partially around the tubular object 20 on a first side 54 of the through-hole 24 in the panel 26. Per block 204 of FIG. 8 and referring to FIG. 10, the method 200 includes closing the clamp 30 (moving to the respective closed position C1) and pushing or sliding towards the clamp 30 to the first side 54 (see arrows in FIG. 9).

Per block 206 of FIG. 8 and referring to FIG. 11, the retainer 32 is positioned in the respective open position O2 at least partially around the tubular object 20 on the second side 56 of the through-hole 24 in the panel 26. Per block 208 of FIG. 8, the retainer 32 is closed (moved into the respective closed position C2, see arrows in FIG. 11) and pushed towards the second side 56.

Per block 210 of FIG. 8 and referring to FIG. 6, the method 200 incudes aligning the retainer hole 90 with the clamp hook 92 and pushing the retainer 32 towards the clamp 30 until the clamp hook 92 is engaged with the retainer hole 90 in a snap-fit relation. FIGS. 1, 6 and 7 show the clamping assembly 10 in the final state, with both the clamp 30 and retainer 32 in their respective closed positions C1, C2.

In summary, the clamp 30 and the retainer 32 are configured to be installed around the through-hole 24 on opposing sides of a panel 26 in respective open positions O1, O2 and then respectively closed. The clamp 30 on the first side 54 of the through-hole 24 is configured to snap-fit onto the retainer 32, which is on the second side 56 of the through-hole 24.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A clamping assembly for supporting a tubular object accessing a through-hole in a panel, the clamping assembly comprising:
    a clamp configured to be positioned at least partially around the tubular object on a first side of the through-hole;
    a retainer configured to be positioned at least partially around the tubular object on a second side of the through-hole, the clamp and the retainer each defining a respective open position and a respective closed position;
    wherein the clamp includes at least one clamp lock mechanism configured to move the clamp between the respective open position and the respective closed position;
    wherein the retainer includes at least one retainer lock mechanism configured to move the retainer between the respective open position and the respective closed position;
    wherein the retainer includes a rim portion having at least one retainer hole; and
    wherein the clamp includes at least one clamp hook configured to engage with the at least one retainer hole in a snap-fit relation when the clamp and the retainer are in the respective closed position at the first side and second side, respectively, of the through-hole.

2. The clamping assembly of claim 1, wherein:
    the at least one clamp hook includes an inclined surface contiguous with a hook base; and
    the hook base is configured to extend over the retainer when the clamp and the retainer are in the respective closed position.

3. The clamping assembly of claim 1, wherein:
    the panel comprises a floor beam in an aircraft and the tubular object is a fuel line.

4. The clamping assembly of claim 1, wherein:
    the rim portion of the retainer includes a plurality of cutouts, the plurality of cutouts being spaced apart and having a predefined size and a predefined shape.

5. The clamping assembly of claim 1, wherein:
    the clamp includes a clamp base portion and a plurality of membranes extending radially outward from the clamp base portion, the plurality of membranes being spaced apart in a circumferential direction; and
    the plurality of membranes is configured to be sufficiently resilient to accommodate different thicknesses of the panel.

6. The clamping assembly of claim 5, wherein:
    the plurality of membranes defines a respective membrane angle between a respective first surface and a reference line parallel to the panel; and
    the respective membrane angle is between about 15 and 30 degrees.

7. The clamping assembly of claim 1, wherein:
    the clamp includes a flexible clamp joint between a first clamp base and a second clamp base, the flexible clamp joint being configured to allow bending of the clamp; and
    the retainer includes a flexible retainer joint between a first retainer base and a second retainer base, the flexible retainer joint being configured to allow bending of the retainer.

8. The clamping assembly of claim 7, wherein:
    the first clamp base defines a first end and the second clamp base defines a second end, the first end and the second end being distal to the flexible clamp joint;
    the at least one clamp lock mechanism includes a primary clamp lock mechanism characterized by a first latch and a first slot, the first latch extending from the first end and the first slot being located on the second end; and
    the first latch is configured to engage with the first slot when the clamp is in the respective closed position such that the clamp fully encircles the tubular object at the first side of the through-hole.

9. The clamping assembly of claim 8, wherein:
    the at least one clamp lock mechanism includes a secondary clamp lock mechanism characterized by a first locking tab and a first groove, the first locking tab being configured to interlock with the first groove when the clamp is in the respective closed position;

the first locking tab extends from the first end of the first clamp base, the first locking tab being positioned radially outward of the first latch; and the first groove is located at the second end of the second clamp base, the first groove being positioned radially outward of the first slot.

10. The clamping assembly of claim 8, wherein:

the first retainer base defines a first edge and the second retainer base defines a second edge, the first edge and the second edge being distal to the flexible retainer joint;

the at least one retainer lock mechanism includes a primary retainer lock mechanism characterized by a second latch and a second slot, the second latch extending from the first edge and the second slot being located on the second edge; and the second latch is configured to engage with the second slot when the retainer is in the respective closed position such that the retainer fully encircles the tubular object at the second side of the through-hole.

11. The clamping assembly of claim 10, wherein:

the at least one retainer lock mechanism includes a secondary retainer lock mechanism characterized by a second locking tab and a second groove, the second locking tab being configured to interlock with the second groove when the retainer is in the respective closed position;

the second locking tab extends from the first edge of the first retainer base, the second locking tab being radially outwards of the second latch; and the second groove is located at the second end of the second retainer base, the second groove being radially outwards of the second slot.

12. The clamping assembly of claim 10, wherein:

the rim portion of the retainer includes a first rim portion and a second rim portion separated by a gap, the first rim portion extending radially outwards from the first retainer base and the second rim portion extending radially outwards from the second retainer base.

13. A method for supporting a tubular object accessing a through-hole in a panel, the method comprising:

positioning a clamp in a respective open position at least partially around the tubular object on a first side of the through-hole, the clamp having least one clamp hook;

moving the clamp into a respective closed position at the first side of the through-hole via at least one clamp lock mechanism;

positioning a retainer in the respective open position at least partially around the tubular object on a second side of the through-hole, the retainer having at least one retainer hole;

moving the retainer into the respective closed position at the second side of the through-hole via at least one retainer lock mechanism; and aligning the at least one retainer hole with the at least one clamp hook and pushing the retainer towards the clamp until the at least one clamp hook is engaged with the at least one retainer hole in a snap-fit relation.

14. The method of claim 13, further comprising:

positioning a plurality of membranes radially outward from a clamp base portion of the clamp, the plurality of membranes being spaced apart in a circumferential direction; and adapting the plurality of membranes to be sufficiently resilient to accommodate different thicknesses of the panel.

15. The method of claim 13, further comprising:

positioning a flexible clamp joint in the clamp between a first clamp base and a second clamp base, the flexible clamp joint being configured to allow bending of the clamp; and positioning a flexible retainer joint in the retainer between a first retainer base and a second retainer base, the flexible retainer joint being configured to allow bending of the retainer.

16. The method of claim 15, further comprising:

including a primary clamp lock mechanism in the at least one clamp lock mechanism, the primary clamp lock mechanism being characterized by a first latch extending from a first end of the first clamp base and a first slot located on a second end of the second clamp base, the first end and the second end being distal to the flexible clamp joint;

engaging the first latch with the first slot when the clamp is in the respective closed position such that the clamp fully encircles the tubular object at the first side of the through-hole;

including a primary retainer lock mechanism in the at least one retainer lock mechanism, the primary retainer lock mechanism being characterized by a second latch extending from a first edge of the first retainer base and a second slot located on a second edge of the second retainer base, the first edge and the second edge being distal to the flexible retainer joint; and engaging the second latch with the second slot when the retainer is in the respective closed position such that the retainer fully encircles the tubular object at the second side of the through-hole.

17. The method of claim 16, further comprising:

including a secondary clamp lock mechanism in the at least one clamp lock mechanism, the secondary clamp lock mechanism being characterized by a first locking tab extending from the first end of the first clamp base and a first groove located at the second end of the second clamp base, the first locking tab and the first groove being respectively radially outwards of the first latch and the first slot;

interlocking the first locking tab with the first groove when the clamp is in the respective closed position;

including a secondary retainer lock mechanism in the at least one retainer lock mechanism, the secondary retainer lock mechanism being characterized by a second locking tab extending from the first end of the first retainer base and a second groove located at the second end of the second retainer base, the second locking tab and the second groove being respectively radially outwards of the second latch and the second slot; and interlocking the second locking tab with the second groove when the retainer is in the respective closed position.

18. An aircraft comprising:

a floor beam having a through-hole;

a tubular object configured to pierce the through-hole;

a clamping assembly for supporting the tubular object, the clamping assembly including a clamp configured to be positioned at least partially around the tubular object on a first side of the through-hole and a retainer configured to be positioned around the tubular object on a second side of the through-hole;

wherein the clamp and the retainer each define a respective open position and a respective closed position;

wherein the clamp includes at least one clamp lock mechanism configured to move the clamp between the respective open position and the respective closed position;

wherein the retainer includes at least one retainer lock mechanism configured to move the retainer between the respective open position and the respective closed position;

wherein the retainer includes a rim portion having at least one retainer hole; and wherein the clamp includes at least one clamp hook configured to engage with the at least one retainer hole in a snap-fit relation when the clamp and the retainer are in the respective closed position at the first side and second side, respectively, of the through-hole.

19. The aircraft of claim 18, wherein:

the clamp includes a clamp base portion and a plurality of membranes extending radially outward from the clamp base portion, the plurality of membranes being spaced apart in a circumferential direction; and the plurality of membranes is configured to be sufficiently resilient to accommodate different thicknesses of the one or more floor beams.

20. The aircraft of claim 18, wherein:

the clamp includes a flexible clamp joint between a first clamp base and a second clamp base, the flexible clamp joint being configured to allow bending of the clamp; and the retainer includes a flexible retainer joint between a first retainer base and a second retainer base, the flexible retainer joint being configured to allow bending of the retainer.

* * * * *